Patented Apr. 27, 1943

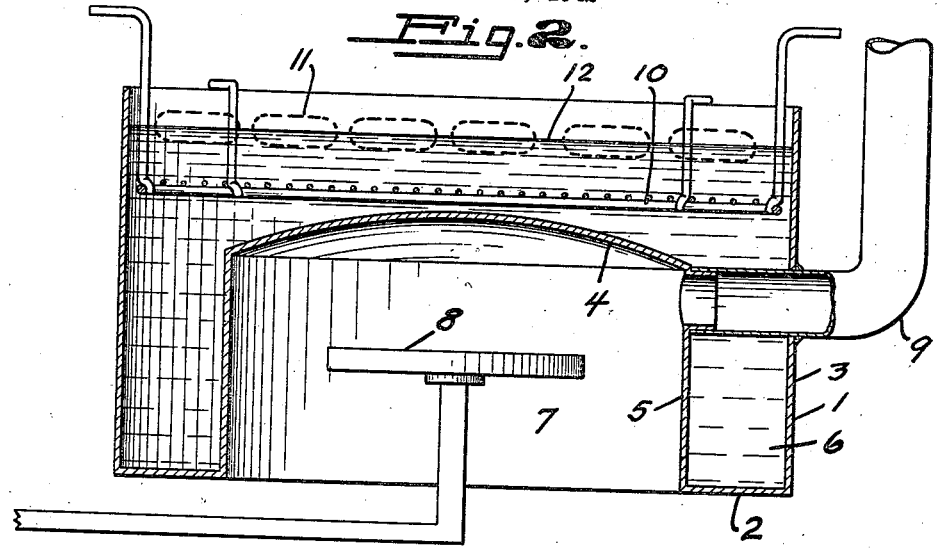
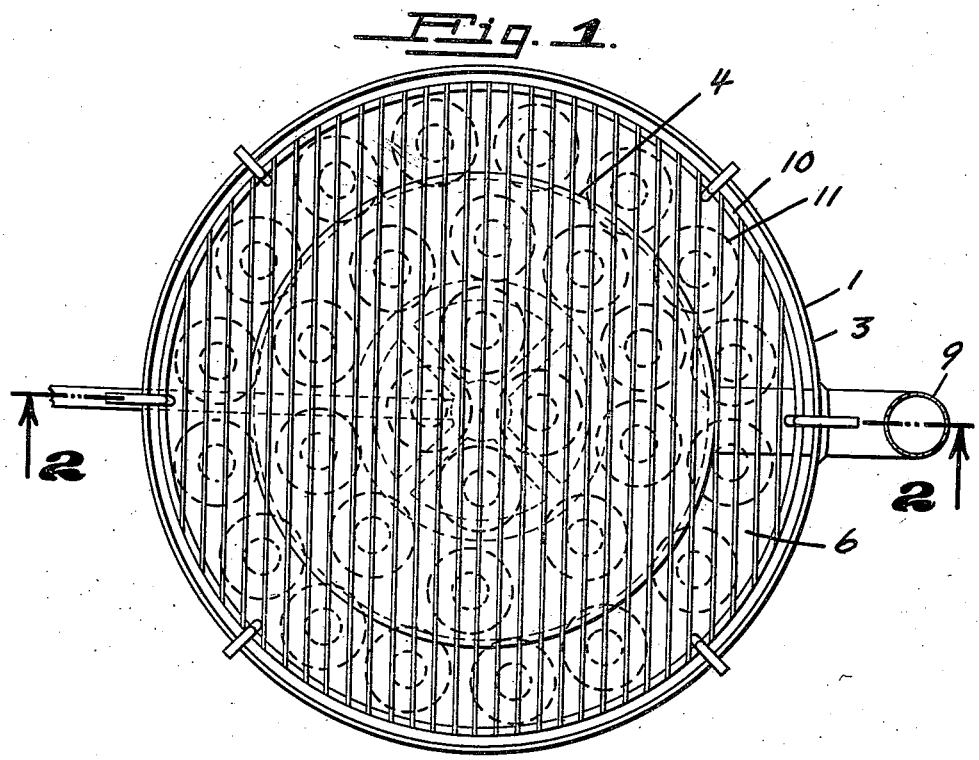

2,317,704

UNITED STATES PATENT OFFICE 2,317,704

DEVICE FOR FRYING DOUGHNUTS OR THE LIKE

Philip K. Winter, Oakland, Calif.

Application January 27, 1942, Serial No. 428,400

2 Claims. (Cl. 53—7)

The present invention relates to improvements in a device for frying doughnuts or the like, and its principal object is to provide a device of the character described in which solids settling from the doughnuts are automatically removed from the frying zone, and are caused to settle into a cooler zone, where they take no part in the circulation caused by the heating of the frying medium.

The conventional device for frying doughnuts comprises a relatively low kettle having a flat bottom to which heat is applied by means of a gas heater, or other heating means. The kettle is filled to a suitable height with a frying medium, such as shortening, which melts under the influence of the heat. The uncooked doughnuts, which usually carry a certain amount of loose particles, flour dust and the like, are made to float on the heated shortening, and during the process, the loose particles settle toward the bottom of the kettle where they are subjected to the immediate influence of the heating means, and are continuously cooked and burned and made to take part in the circulation which tends to break down the shortening, to darken it, to greatly increase the free fatty acid content of the shortening, to cause smoke to rise, and to produce a burned and off flavored (rancid) taste in the finished product.

In the present invention it is proposed to eliminate this undesirable feature and to provide a device in which the settling solids are immediately removed from the influence of the heat and are made to settle into a zone which remains relatively cool. These are periodically drained off and discarded.

The preferred form of my invention is illustrated in the accompanying drawing, forming part of this application, in which:

Figure 1 shows a top plan view of my device, and

Figure 2, a vertical section, taken along line 2—2 of Figure 1.

While I have shown only the preferred form of my invention, I wish to have it understood that various changes or modifications may be made within the scope of the claims hereto attached, without departing from the spirit of the invention.

In its preferred form, my invention comprises a kettle 1, which may be of any suitable shape, and which is here shown as comprising a bottom 2 and a vertical cylindrical side wall 3 rising therefrom and being open at its upper end. It is apparent that the kettle may be made in any other desirable shape, square, rectangular or oblong, to suit particular conditions.

The bottom 2 has a raised bottom section 4 supported by a cylindrical partition 5, which latter thus forms an annular well 6 with the wall of the kettle, while the raised bottom and the partition form a central heating chamber 7 adapted to accommodate a heater 8, which is preferably arranged above the bottom of the well, and in proper central position with respect to the raised bottom 4. The latter is made dome-shaped or tapered to guide settling solids toward the well.

A suitable vent 9 connects the upper portion of the heating chamber 7 with the atmosphere and allows the products of combustion to escape therethrough. A screen 10 of conventional type may be used for facilitating insertion and removal of the doughnuts, which latter are indicated at 11.

It will be noted that, in this manner, the shortening shown at 12, is divided into two strata, an upper stratum which is subject to the direct heat influence, and which, in normal operation, is kept at a temperature of approximately 400° F., and a lower stratum confined within the well which remains relatively cool, and which in the actual operation of the device rarely rises above 130° F.

It is apparent that various different forms of kettle may be used to bring about the same condition, and to produce substantially the same result.

In operation, the screen 10, while on the outside of the kettle, is filled with doughnuts and then lowered into the kettle, which causes the doughnuts to float on top of the shortening in the manner indicated in Figure 2. Any solid particles dropping from the doughnuts will settle toward the bottom, and if above the raised bottom 4, will be guided by the shape thereof toward the well 6 where they are removed from the influence of the heat, and come to rest so that they do not take any further part in the circulation of the shortening caused by the heat.

Since the well is continuous and of considerable width, there is room for a certain amount of circulation which allows the entire body of frying medium to be used for frying the doughnuts, while depositing the solid particles in the bottom of the well. The outer wall of the kettle, due to the very considerable spacing between the two walls, naturally remains cooler than the inner wall, and a natural circulation will be set up by the liquid rising in the hottest portion, that is over the center of the dome, radiating toward the outer wall, descending along the outer wall and ascending along the inner wall toward the central portion of the dome.

The shortening thus remains clear and fresh for a long time, and may be used, in successive operations, to the point of consumption. Since the shortening is the most expensive item in the manufacture of doughnuts, the use of my device involves a considerable saving.

The device further produces better doughnuts of more uniform quality in view of the better quality of the shortening.

It is apparent that my device may be used in connection with the manufacture of other products, fried in deep fat, such as potato chips, french fried potatoes, and the like.

I claim:

1. In a device for frying doughnuts or the like, a kettle for holding a frying medium, the kettle being relatively low as compared with its width, and having a vertical outer wall open at its upper end to allow of the insertion and removal of a material-supporting screen substantially coextensive in size with the inside dimensions of the kettle, an inner wall concentric therewith and spaced therefrom, a flat bottom section connecting the lower ends of the two walls to form a continuous annular well therewith and a dome overlying the inner wall and freely communicating with the well for causing solids to settle toward the bottom of the well, the inner wall being at least one-half the height of the kettle to leave a relatively shallow stratum of frying medium above the dome and to provide a deep well, and means for applying heat to the dome from below for directly heating the upper stratum of the frying medium, the heating means being arranged substantially midway of the height of the well to leave the lower portion of the well relatively cool, and the well being sufficiently wide to cause circulation of the medium downward along the outer wall and upward along the inner wall due to differences in temperature between the two walls.

2. In a device for frying doughnuts or the like, a kettle for holding a frying medium, the kettle comprising a vertical outer wall open at its upper end to allow of the insertion and removal of a material-supporting screen substantially coextensive in size with the inside dimensions of the kettle, an inner wall concentric therewith and spaced therefrom, a flat bottom section connecting the lower ends of the two walls to form a continuous annular well therewith, and a dome overlying the inner wall and freely communicating with the well for causing solids to settle toward the bottom of the well, the inner wall being of a height to leave a relatively shallow stratum of frying medium above the dome and to provide a deep well, and means for applying heat to the dome from below for directly heating the upper stratum of the frying medium, the heating means being arranged substantially higher than the bottom of the well, and the well being sufficiently wide to cause circulation of the medium downward along the outer wall and upward along the inner wall due to differences in temperature between the two walls.

PHILIP K. WINTER.